(12) United States Patent
Xue et al.

(10) Patent No.: US 10,548,066 B2
(45) Date of Patent: Jan. 28, 2020

(54) CONTROL INFORMATION SENDING/RECEIVING METHOD AND DEVICE

(71) Applicant: Huawei Technologies Co., Ltd., Shenzhen, Guangdong (CN)

(72) Inventors: Lixia Xue, Beijing (CN); Xu Zhang, Beijing (CN); Jianguo Wang, Beijing (CN); Yi Qin, Shanghai (CN); Yongzhao Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/248,454

(22) Filed: Jan. 15, 2019

(65) Prior Publication Data

US 2019/0150067 A1    May 16, 2019

Related U.S. Application Data

(63) Continuation of application No. PCT/CN2018/097425, filed on Jul. 27, 2018.

(30) Foreign Application Priority Data

Aug. 11, 2017   (CN) .......................... 2017 1 0687956

(51) Int. Cl.
*H04W 72/00*   (2009.01)
*H04W 48/10*   (2009.01)
(Continued)

(52) U.S. Cl.
CPC ......... *H04W 48/10* (2013.01); *H04J 11/0073* (2013.01); *H04J 11/0079* (2013.01);
(Continued)

(58) Field of Classification Search
CPC .... H04H 60/41; H04H 60/43; H04N 21/4622; H04W 56/001; H04W 72/005
See application file for complete search history.

(56) References Cited

U.S. PATENT DOCUMENTS

2013/0201975 A1   8/2013   Chen et al.
2015/0237604 A1   8/2015   Shi et al.
(Continued)

FOREIGN PATENT DOCUMENTS

CN   102740372 A   10/2012
CN   103716274 A   4/2014
(Continued)

OTHER PUBLICATIONS

Kowalewski, Frank and Seidel, Eiko; "5G Frame Structure", Nomor Research GmbH, Aug. 2017, pp. 1-6 (Year: 2017).*
(Continued)

*Primary Examiner* — Salvador E Rivas
(74) *Attorney, Agent, or Firm* — Leydig, Voit & Mayer, Ltd.

(57) ABSTRACT

A control information sending/receiving method and device are provided for indicating a time-frequency location of a control channel to a terminal device in a 5G NR system or a future evolved LTE system. The method includes: receiving, by a terminal device, broadcast information; determining, from at least two predefined time-domain locations, a time-domain location of a broadcast channel carrying the broadcast information; determining a time-domain location of a control channel based on the time-domain location of the broadcast channel; and performing control channel detection in the determined time-domain location of the control channel.

30 Claims, 8 Drawing Sheets

(51) Int. Cl.
*H04J 11/00* (2006.01)
*H04W 56/00* (2009.01)
*H04W 72/04* (2009.01)
*H04N 21/462* (2011.01)

(52) U.S. Cl.
CPC ....... *H04W 56/001* (2013.01); *H04W 72/005* (2013.01); *H04N 21/4622* (2013.01); *H04W 72/042* (2013.01)

(56) References Cited

U.S. PATENT DOCUMENTS

2016/0182209 A1  6/2016  Li et al.
2017/0311285 A1* 10/2017  Ly ...................... H04W 72/005

FOREIGN PATENT DOCUMENTS

| CN | 102594513 B | 1/2015 |
| CN | 104348579 A | 2/2015 |
| CN | 105591712 A | 5/2016 |
| CN | 104094551 B | 7/2017 |

OTHER PUBLICATIONS

"Discussion on remaining system information delivery," 3GPP TSG RAN WG1 NR Ad-Hoc #2, R1-1710841Qingdao, P. R. China, pp. 1-4, 3rd Generation Partnership Project—Valbonne, France (Jun. 27-30, 2017).

"3rd Generation Partnership Project; Technical Specification Group Radio Access Network; NR; Physical channels and modulation (Release 15)," 3GPP TS 38.211 V0.1.0, pp. 1-22, 3rd Generation Partnership Project—Valbonne, France (Jun. 2017).

"3rd Generation Partnership Project; Technical Specification Group Radio Access Network; NR;Radio Resource Control (RRC); Protocol specification (Release 15 )," 3GPP TS 38.331 V0.0.4, pp. 1-22, 3rd Generation Partnership Project—Valbonne, France (Jun. 2017).

"Discussion on system information delivery for NR," 3GPP TSG RAN WG1 Meeting #89, R1-1708440 Hangzhou, P.R. China, pp. 1-4, 3rd Generation Partnership Project—Valbonne, France (May 15-19, 2017).

* cited by examiner

CONTROL INFORMATION SENDING/RECEIVING METHOD AND DEVICE

CROSS-REFERENCE TO RELATED APPLICATIONS

This application is a continuation of International Application No. PCT/CN2018/097425, filed on Jul. 27, 2018, which claims priority to Chinese Patent Application No. 201710687956.7, filed on Aug. 11, 2017. The disclosures of the aforementioned applications are hereby incorporated by reference in their entireties.

TECHNICAL FIELD

Embodiments of this application relate to the field of communications technologies, and in particular, to a method and device of sending/receiving control information.

BACKGROUND

In an existing Long Term Evolution (LTE) system, a network device indicates a time-frequency location of a control channel to a terminal device by using broadcast information, and then the terminal device performs control channel detection in the time-frequency location of the control channel. The broadcast information carries two pieces of information used to indicate, respectively, a time-domain location and a frequency-domain location of the control channel. The control channel is a resource used for control information transmission.

So far, a technical solution for indicating a time-frequency location of a control channel to a terminal device by a network device has not been defined for a future 5th generation (5G) new radio (NR) system or a future evolved LTE system. If the technical solution for indicating a time-frequency location of a control channel to a terminal device by a network device in the existing LTE system is still used, in the 5G NR system or the future evolved LTE system, signaling overheads of the two pieces of information used for indicating the time-domain location and the frequency-domain location of the control channel are relatively high because there may be a plurality of schemes for configuring the time-frequency location of the control channel in one subframe. As a result, signaling overheads of the broadcast information are relatively high.

To sum up, a technical solution for indicating a time-frequency location of a control channel to a terminal device by a network device needs to be urgently designed for the future 5G NR system or the future evolved LTE system.

SUMMARY

Embodiments of this application provide a control information sending/receiving method and device, to implement that a network device indicates a time-frequency location of a control channel to a terminal device in a 5G NR system or a future evolved LTE system, and thereby implement that the terminal device performs control channel detection in the time-frequency location of the control channel.

According to a first aspect, an embodiment of this application provides a control information receiving method, including: receiving broadcast information; determining, from at least two predefined time-domain locations, a time-domain location of a broadcast channel carrying the broadcast information; determining a time-domain location of a control channel based on the time-domain location of the broadcast channel; and performing control channel detection in the time-domain location of the control channel.

The at least two predefined time-domain locations are time-domain locations possibly occupied by the broadcast channel within one subframe. The time-domain location of the broadcast channel is a location relative to a timeslot boundary, and there may be at least two time-domain locations for the broadcast channel in one timeslot. The time-domain location of the control channel is a location relative to the timeslot boundary.

According to the method, it can be implemented that a network device indicates a time-frequency location of a control channel to a terminal device in a 5G NR system or a future evolved LTE system, so that the terminal device performs control channel detection in the time-frequency location of the control channel. Compared with a technical solution that a network device indicates a time-frequency location of a control channel to a terminal device in an existing LTE system, this method can reduce signaling overheads for indicating a time-domain location of a control channel, thereby reducing signaling overheads of broadcast information.

Correspondingly, there are a plurality of methods for determining the time-domain location of the control channel based on the time-domain location of the broadcast channel. The following uses two of the plurality of methods as examples for description.

A first method is: determining an offset based on the time-domain location of the broadcast channel, and determining the time-domain location of the control channel based on the offset.

By using the first method, the terminal device may determine the time-domain location of the control channel based on the time-domain location of the broadcast channel and the offset corresponding to the time-domain location of the broadcast channel, and the broadcast information does not need to carry information used for indicating the time-domain location of the control channel, thereby reducing the signaling overheads of the broadcast information.

A second method is: determining the time-domain location of the control channel based on a correspondence between the time-domain location of the broadcast channel and the time-domain location of the control channel.

By using the second method, the terminal device may determine the time-domain location of the control channel based on the time-domain location of the broadcast channel and a preset correspondence between the time-domain location of the broadcast channel and the time-domain location of the control channel, and the broadcast information does not need to carry information used for indicating the time-domain location of the control channel, thereby reducing the signaling overheads of the broadcast information.

In a possible implementation, preconfiguration of the time-domain location of the broadcast channel and the time-domain location of the control channel is not randomly performed. One of the following options needs to be true between a time-domain location of any broadcast channel and a time-domain location, determined based on the time-domain location of the broadcast channel, of a control channel:

First option: The time-domain location of the control channel is orthogonal to a time-domain location of the broadcast channel and a synchronization signal corresponding to the broadcast channel.

Second option: The time-domain location of the control channel is the same or partially the same as a time-domain location of the broadcast channel and a synchronization signal corresponding to the broadcast channel.

Third option: A portion of the time-domain location of the control channel is orthogonal to a time-domain location of the broadcast channel and a synchronization signal corresponding to the broadcast channel, and the other portion of the time-domain location of the control channel is the same or partially the same as the time-domain location of the broadcast channel and the synchronization signal corresponding to the broadcast channel.

In a possible implementation, after the broadcast information is received, the time-domain location of the control channel is determined based on the time-domain location of the broadcast channel and a subcarrier width used by a resource in which the control channel is located, where the received broadcast information includes information used to indicate the subcarrier width used by the resource in which the control channel is located.

In this way, the terminal device may determine the time-domain location of the control channel based on the time-domain location of the broadcast channel and the subcarrier width used by the resource in which the control channel is located, and the broadcast information does not need to carry information used for indicating the time-domain location of the control channel, thereby reducing the signaling overheads of the broadcast information.

In a possible implementation, the time-domain location of the control channel is determined from a time-domain resource set based on the time-domain location of the broadcast channel, where the broadcast information includes indication information used for indicating the time-domain resource set of a control channel.

In this way, the terminal device may determine the time-domain location of the control channel from the time-domain resource set based on the time-domain location of the broadcast channel, and the broadcast information does not need to carry information used for indicating the time-domain location of the control channel, thereby reducing the signaling overheads of the broadcast information.

In a possible implementation, a reference signal of the broadcast channel is QCL with a reference signal of the control channel, and/or the reference signal of the broadcast channel is QCL with a synchronization signal of the control channel.

In a possible implementation, system information is received, where the system information includes a time-frequency resource of another control channel different from the control channel.

According to a second aspect, an embodiment of this application provides a control information sending method, including: sending broadcast information, and sending a control channel to a terminal device in a time-domain location of the control channel. The time-domain location of the control channel is a location relative to a timeslot boundary, the time-domain location of the control channel is determined based on a time-domain location of a broadcast channel carrying the broadcast information, and the time-domain location of the broadcast channel is a location relative to the timeslot boundary.

According to the method, it can be implemented that a network device indicates a time-frequency location of a control channel to a terminal device in a 5G NR system or a future evolved LTE system, so that the terminal device performs control channel detection in the time-frequency location of the control channel. Compared with a technical solution that a network device indicates a time-frequency location of a control channel to a terminal device in an existing LTE system, this method can reduce signaling overheads for indicating a time-domain location of a control channel, thereby reducing signaling overheads of broadcast information.

In a possible implementation, preconfiguration of the time-domain location of the broadcast channel and the time-domain location of the control channel is not randomly performed. One of the following options needs to be true between a time-domain location of any broadcast channel and a time-domain location, determined based on the time-domain location of the broadcast channel, of a control channel: The time-domain location of the control channel is orthogonal to a time-domain location of the broadcast channel and a synchronization signal corresponding to the broadcast channel; the time-domain location of the control channel is the same or partially the same as a time-domain location of the broadcast channel and a synchronization signal corresponding to the broadcast channel; and a portion of the time-domain location of the control channel is orthogonal to a time-domain location of the broadcast channel and a synchronization signal corresponding to the broadcast channel, and the other portion of the time-domain location of the control channel is the same or partially the same as a time-domain location of the broadcast channel and the synchronization signal corresponding to the broadcast channel.

In a possible implementation, the broadcast information includes information used for indicating a subcarrier width used by a resource in which the control channel is located. That the time-domain location of the control channel is determined based on the time-domain location of the broadcast channel carrying the broadcast information is that the time-domain location of the control channel is determined based on the time-domain location of the broadcast channel carrying the broadcast information and based on the subcarrier width used by the resource in which the control channel is located.

In a possible implementation, the broadcast information includes indication information used for indicating a time-domain resource set of a control channel.

In a possible implementation, a reference signal of the broadcast channel is QCL with a reference signal of the control channel, and/or the reference signal of the broadcast channel is QCL with a synchronization signal of the control channel.

In a possible implementation, system information is sent to the terminal device, where the system information includes a time-frequency resource of another control channel different from the control channel.

According to a third aspect, an embodiment of this application provides a control information receiving apparatus. The apparatus may be a terminal device, or may be a chip inside a terminal device. The apparatus may include a processing unit and a transceiver unit. When the apparatus is a terminal device, the processing unit may be a processor, and the transceiver unit may be a transceiver. The terminal device may further include a storage unit, and the storage unit may be a memory. The storage unit is configured to store an instruction, and the processing unit executes the instruction stored in the storage unit, so that the terminal device performs the corresponding function in the first aspect. When the apparatus is a chip inside a terminal device, the processing unit may be a processor, and the transceiver unit may be an input/output interface, a pin, a circuit, or the like. The processing unit executes an instruction stored in a storage unit, so that the terminal device performs the corresponding function in the first aspect. The storage unit may be a storage unit (for example, a register or a cache) inside the chip, or may be a storage unit (for example, a read-only memory or a random access memory) located outside the chip yet inside the terminal device.

According to a fourth aspect, an embodiment of this application provides a control information sending apparatus. The apparatus may be a network device, or may be a chip inside a network device. The apparatus may include a processing unit and a transceiver unit. When the apparatus is a network device, the processing unit may be a processor, and the transceiver unit may be a transceiver. The network device may further include a storage unit, and the storage unit may be a memory. The storage unit is configured to store an instruction, and the processing unit executes the instruction stored in the storage unit, so that the network device performs the corresponding function in the second aspect. When the apparatus is a chip inside a network device, the processing unit may be a processor, and the transceiver unit may be an input/output interface, a pin, a circuit, or the like. The processing unit executes an instruction stored in a storage unit, so that the network device performs the corresponding function in the second aspect. The storage unit may be a storage unit (for example, a register or a cache) inside the chip, or may be a storage unit (for example, a read-only memory or a random access memory) located outside the chip yet inside the network device.

According to a fifth aspect, an embodiment of this application provides a computer storage medium. The storage medium stores a software program. When the software program is read and executed by one or more processors, the method in any one of the first aspect and the implementations of the first aspect can be implemented, or when the software program is read and executed by one or more processors, the method in any one of the second aspect and the implementations of the second aspect can be implemented.

According to a sixth aspect, an embodiment of this application provides a computer program product, where the computer program product includes computer program code. When the computer program code is executed by a communications unit and a processing unit, or a transceiver and a processor of a communications device (for example, a terminal device or a network device), the communications device performs the method in any one of the first aspect and the implementations of the first aspect, or the communications device performs the method in any one of the second aspect and the implementations of the second aspect.

According to a seventh aspect, an embodiment of this application further provides a communications system, where the communications system includes a terminal device and a network device. The terminal device performs the method in any one of the first aspect and the implementations of the first aspect, and the network device performs the method in any one of the second aspect and the implementations of the second aspect.

According to an eighth aspect, a chip system is provided. The chip system includes a processor, configured to support a terminal device or a network device in implementing the method described in the foregoing aspects, for example, generating or processing data and/or information in the method. In a possible design, the chip system further includes a memory, where the memory is configured to store necessary program instructions and data of the terminal device or the network device. The chip system may be composed of a chip, or may include a chip and another discrete device.

DETAILED DESCRIPTION OF EMBODIMENTS

In a 5G NR system or a future evolved LTE system, during control channel detection, a terminal device needs to learn a time-frequency location of a control channel. If a technical solution for indicating a time-frequency location of a control channel to a terminal device by a network device in an existing LTE system is still used, signaling overheads of two pieces of information used for indicating a time-domain location and a frequency-domain location of the control channel are relatively high. As a result, signaling overheads of broadcast information is relatively high. So far, a technical solution for indicating a time-frequency location of a control channel to a terminal device by a network device has not been defined for the 5G NR system or the future evolved LTE system.

Therefore, embodiments of this application provide a control information sending/receiving method and device, to implement that a network device indicates a time-frequency location of a control channel to a terminal device in the 5G NR system or the future evolved LTE system, and therefore the terminal device performs control channel detection in the time-frequency location of the control channel. Compared with the technical solution that a network device indicates a time-frequency location of a control channel to a terminal device in the conventional LTE system, the technical solution provided in the embodiments of this application can reduce the signaling overheads for indicating a time-domain location of a control channel, thereby reducing the signaling overheads of broadcast information. The method and the apparatus are based on a same inventive concept. Because principles of the method and the apparatus for resolving a problem are similar, mutual reference may be made between implementation of the apparatus and implementation of the method, and repeated descriptions are omitted.

Figure 1A:
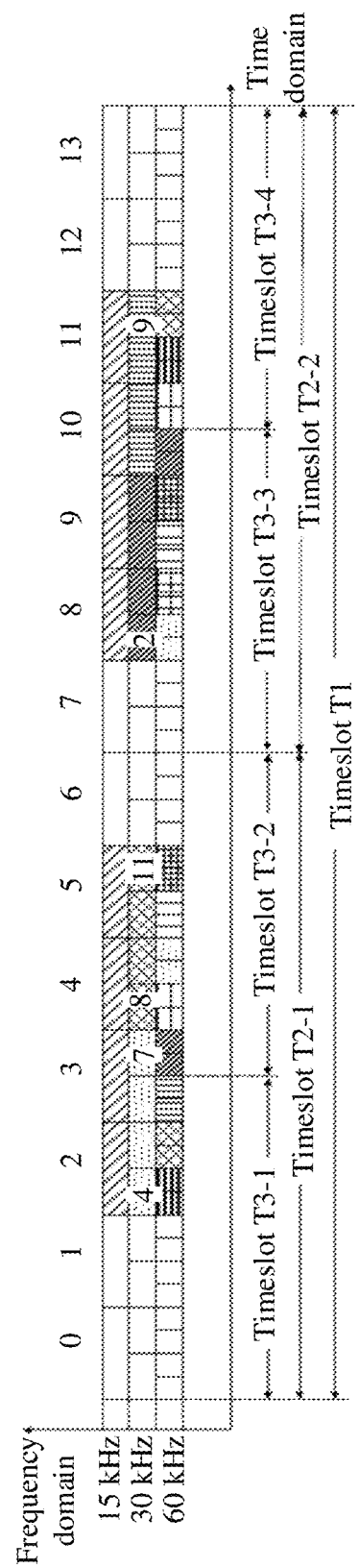
FIG. 1A is a schematic architectural diagram of a subframe in the prior art.

In the 5G NR system or the future evolved LTE system, one subframe includes a plurality of symbols, and one subframe may include different quantities of timeslots depending on different subcarrier widths. A structure of one subframe shown in FIG. 1A is used as an example. Each timeslot includes 14 symbols with numbers 0 to 13. When a subcarrier width is 15 kHz, the subframe includes one timeslot T1. When the subcarrier width is 30 kHz, the subframe includes two timeslots T2-1 and T2-2. When the subcarrier width is 60 kHz, the subframe includes four timeslots T3-1 to T3-4. Symbols in a shadowed area of FIG. 1A may be a time-domain location in which a synchronization signal block is located, that is, a time-domain location that can be occupied by a broadcast channel. In FIG. 1A, when the subcarrier width is 30 kHz, the time-domain location of the broadcast channel may be symbols with numbers 4 to 11 in the timeslot T2-1 and symbols with numbers 2 to 9 in the timeslot T2-2. Because the broadcast channel may have at least two time-domain locations in one timeslot, there may be a plurality of schemes for configuring the time-frequency location of the control channel in one subframe.

The technical solution provided in the embodiments of this application may be applicable to a plurality of systems. The system to which the technical solution provided in the embodiments of this application is applicable may be a non-orthogonal multiple access (NOMA)-based communications system, such as a sparse code multiple access (SCMA) system or a low density signature (LDS) system. The SCMA system and the LDS system may have other names in the field of communications, which are not enumerated herein. The system to which the technical solution provided in the embodiments of this application is applicable may be a NOMA-based multi-carrier communications system, for example, a NOMA system, an orthogonal frequency division multiplexing (OFDM) system, a filter bank multicarrier (FBMC) system, a generalized frequency division multiplexing (GFDM) system, or a filtered orthogonal frequency division multiplexing (F-OFDM) system. The system to which the technical solution provided in the embodiments of this application is applicable may also be the 5G NR system or the future evolved LTE system. The plurality of systems all include a terminal device and a network device.

Figure 1B:
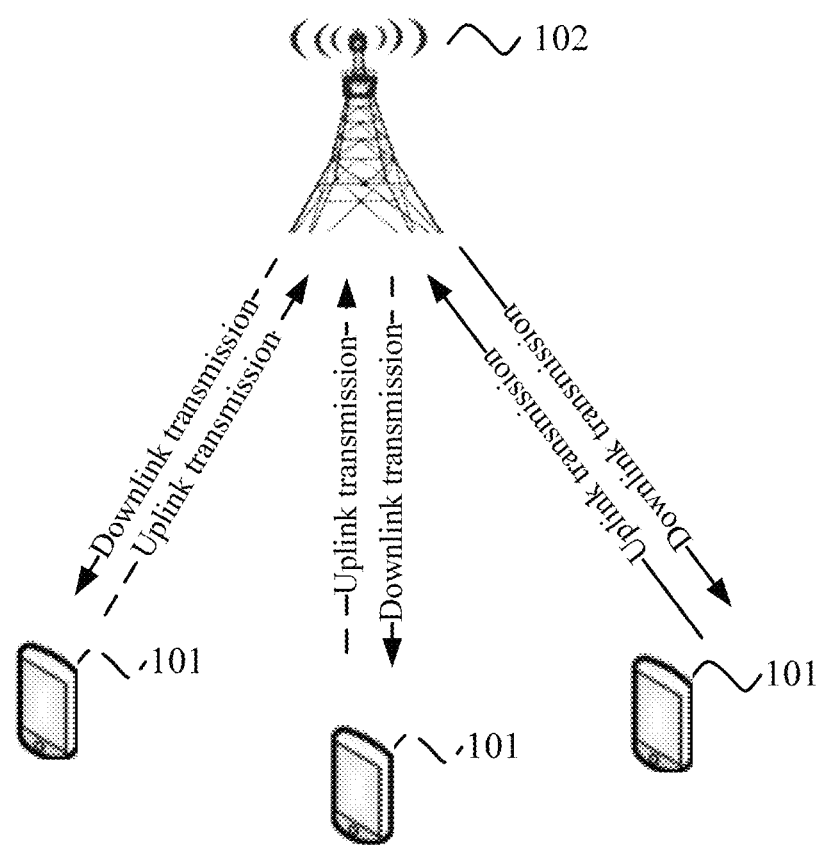
FIG. 1B is a schematic architectural diagram of a network architecture according to an embodiment of this application.

The technical solution provided in the embodiments of this application is applicable to a scenario in which control information is transmitted between a terminal device and a network device. A schematic diagram of a network architecture shown in FIG. 1B is used as an example. FIG. 1B includes terminal devices 101 and a network device 102. Only three terminal devices 101 and one network device 102 are shown in FIG. 1B. In actual application, there may be one or more terminal devices 101 and one or more network devices 102. The terminal devices 101 are within a coverage area of the network device 102. The network device 102 is used to provide a communications service for the terminal devices 101, and the terminal devices 101 can receive broadcast information, control information, and the like that are sent by the network device 102. Arrows shown in FIG. 1B may be used to indicate uplink transmission or downlink transmission between the terminal devices 101 and the network device 102.

In the embodiments of this application, the terminal device may be an access terminal, a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device or computing device having a wireless communication function, another processing device connected to a wireless modem, an in-vehicle device, a wearable device, user equipment in a 5G system, user equipment in a future evolved public land mobile network (PLMN), or the like. This is not limited in the embodiments of this application.

In the embodiments of the present invention, the network device may be a device configured to communicate with user equipment. The network device may be a base transceiver station (BTS) in a Global System for Mobile Communications (GSM) system or a Code Division Multiple Access (CDMA) system, may be a NodeB (NB) in a Wideband Code Division Multiple Access (WCDMA) system, or may be an evolved NodeB (eNB or eNodeB) in an LTE system. Alternatively, the network device may be a wireless controller in a cloud radio access network (CRAN) scenario, or may be a relay station, an access point, an in-vehicle device, a wearable device, a network device in a 5G system, a network device in a future evolved PLMN network, or the like. This is not limited in the embodiments of this application.

The following explains some terms in the embodiments of this application, to help understanding of a person skilled in the art.

Symbols in the embodiments of this application may be one or a combination of the following types of symbols: OFDM symbols, SCMA symbols, F-OFDM symbols, NOMA symbols, and the like. This is not limited in the embodiments.

A subframe is a time-frequency resource that occupies an entire system bandwidth in frequency domain, and has a fixed time length, for example, 1 millisecond, in time domain.

A timeslot is a basic time-frequency resource unit. One timeslot may include at least one symbol. For example, one timeslot may include 7 or 14 consecutive OFDM symbols.

A subcarrier width is a finest granularity of frequency-domain resources. For example, in an LTE system, a subcarrier width of one subcarrier may be 15 kilohertz (kHz), and in a 5G system, a width of one subcarrier may be one of 15 kHz, 30 kHz, and 60 kHz.

A physical resource block may occupy a frequency-domain resource of P consecutive subcarriers in frequency domain, and may occupy a time-domain resource of Q consecutive OFDM symbols in time domain, where both P and Q are natural numbers greater than or equal to 1. For example, one physical resource block may occupy 12 consecutive subcarriers in frequency domain and occupy 7 consecutive OFDM symbols in time domain. For the physical resource block, a value of P may be 12 and a value of Q may be 7; or the value of P may be 12 and the value of Q may be 14; or the value of P may be 12 and the value of Q may be 1.

A resource element group may occupy a frequency-domain resource of P consecutive subcarriers in frequency domain, and may occupy a time-domain resource of one OFDM symbol in time domain, where P is a natural number greater than 1. For example, one resource element group may occupy 12 consecutive subcarriers in frequency domain.

For a control channel unit, one control channel unit may be corresponding to a plurality of resource element groups, and a quantity of resource element groups corresponding to one control channel unit is fixed, for example, six resource element groups corresponding to one control channel unit.

A relationship between a broadcast channel and a control channel is one or a combination of the following relationships: a reference signal of the broadcast channel is quasico-located (QCL) with a reference signal of the control channel; and the reference signal of the broadcast channel is QCL with a synchronization signal of the control channel. The reference signal of the broadcast channel, the reference signal of the control channel, and the synchronization signal of the control channel may be carried in one synchronization signal block (SS block).

A plurality means at least two.

In addition, it should be understood that the terms "first", "second", and the like in descriptions of the embodiments of this application are merely intended for distinguished description, and should not be interpreted as an indication or implication of relative importance, or as an indication or implication of ordering.

The following further describes in detail the embodiments of this application with reference to the accompanying drawings.

Figure 2:
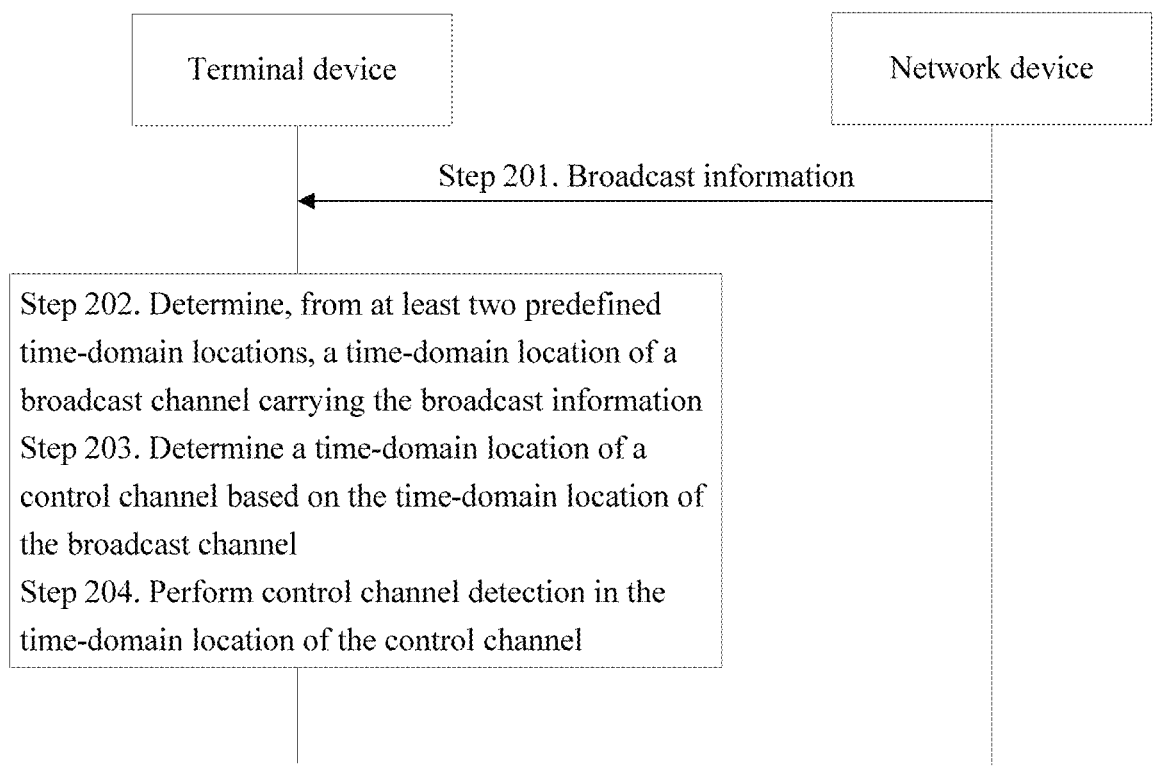
FIG. 2 is a schematic flowchart of a control information sending/receiving method according to an embodiment of this application.

An embodiment of this application provides a control information receiving method. The method is applicable to a 5G system or a future evolved LTE system. FIG. 2 is a schematic flowchart of the control information receiving method, including the following steps.

Step 201: A terminal device receives broadcast information.

In step 201, the terminal device receives, through blind detection in at least two predefined time-domain locations, the broadcast information sent by a network device.

The at least two predefined time-domain locations are time-domain locations possibly occupied by a broadcast channel within one subframe. A structure of one subframe shown in FIG. 1A is used as an example. Each timeslot includes 14 symbols with numbers 0 to 13. When a subcarrier width is 15 kHz, the subframe includes one timeslot T1. When the subcarrier width is 30 kHz, the subframe includes two timeslots T2-1 and T2-2. When the subcarrier width is 60 kHz, the subframe includes four timeslots T3-1 to T3-4. Symbols in a shadowed area of FIG. 1A may be a time-domain location in which a synchronization signal block is located, that is, a time-domain location that can be occupied by the broadcast channel. In FIG. 1A, when the subcarrier width is 30 kHz, the time-domain location of the broadcast channel may be symbols with numbers 4 to 11 in the timeslot T2-1 and symbols with numbers 2 to 9 in the timeslot T2-2. There may be at least two time-domain locations for the broadcast channel in one timeslot.

Step 202: After receiving the broadcast information, the terminal device determines, from at least two predefined time-domain locations, a time-domain location of a broadcast channel carrying the broadcast information.

The time-domain location of the broadcast channel is a location relative to a timeslot boundary, and the timeslot boundary is usually a start boundary of a timeslot (or referred to as a left boundary of the timeslot). The timeslot boundary in this embodiment may alternatively be an end boundary of the timeslot (or referred to as a right boundary of the timeslot). For example, a start symbol of a timeslot is a symbol with a number 0, and the timeslot boundary is usually a left boundary of the symbol with the number 0. In an example that the timeslot boundary is a start boundary of a timeslot, that the time-domain location of the broadcast channel is a location relative to a timeslot boundary can be understood as: that the time-domain location of the broadcast channel is a location relative to the start boundary of the timeslot. In this case, if the time-domain location of the broadcast channel is a 4th symbol in the timeslot, the time-domain location of the broadcast channel is the 4th symbol relative to the start boundary of the timeslot.

In this embodiment, step 202 may be implemented in the following two manners:

Manner 1: The broadcast information received by the terminal device includes time-domain location indication information.

The time-domain location indication information may be used to indicate the time-domain location of the broadcast channel carrying the broadcast information. The broadcast information is the broadcast information received by the terminal device in step 201, and the time-domain location of the broadcast channel carrying the broadcast information is one of the at least two predefined time-domain locations. For example, the time-domain location indication information may be represented by a bit carried in the broadcast information.

Manner 2: The terminal device receives other indication information that is used to indicate the time-domain location of the broadcast channel carrying the broadcast information.

In manner 2, the other indication information includes but is not limited to first indication information and second indication information. The first indication information is used to indicate a location type of the time-domain location of the broadcast channel carrying the broadcast information, and each location type of the time-domain location respectively includes at least one time-domain location. The second indication information is used to indicate the time-domain location, in the location type indicated by the first indication information, of the broadcast channel for carrying the broadcast information. The second indication information may be carried in a reference signal of the broadcast channel. For example, the reference signal of the broadcast channel includes second indication information of which a bit sequence length is 3 bits. Alternatively, a part of the second indication information is carried in a reference signal of the broadcast channel, and the other part of the second indication information may be carried in system information (MIB). For example, a bit sequence length of the second indication information is 6 bits, the reference signal of the broadcast channel includes first 3 bits of the 6 bits, and the MIB includes information of last 3 bits of the 6 bits.

In step 202, the terminal device receives first indication information sent by the network device, and determines, from at least two preset location types of time-domain locations based on the first indication information, a location type of the time-domain location of the broadcast channel carrying the broadcast information. The terminal device receives second indication information sent by the network device, and determines, based on the second indication information, the time-domain location of the broadcast channel for carrying the broadcast information from at least one time-domain location corresponding to the determined location type of the time-domain location.

For example, it is assumed that the following two location types of time-domain locations are preset:

Location type 1: The location type 1 includes eight time-domain locations, which are symbols with numbers 2 to 5 in a timeslot n, symbols with numbers 6 to 9 in the timeslot n, symbols with numbers 4 to 7 in a timeslot n+1, symbols with numbers 8 to 11 in the timeslot n+1, symbols with numbers 2 to 5 in a timeslot n+2, symbols with numbers 6 to 9 in the timeslot n+2, symbols with numbers 4 to 7 in a timeslot n+3, and symbols with numbers 8 to 11 in the timeslot n+3.

Location type 2: The location type 2 includes 64 time-domain locations, which are symbols with numbers 2 to 5 in a timeslot n, symbols with numbers 8 to 11 in the timeslot n, symbols with numbers 2 to 5 in a timeslot n+1, symbols with numbers 8 to 11 in a timeslot n+1, . . . , symbols with numbers 2 to 5 in a timeslot n+7, and symbols with numbers 8 to 11 in the timeslot n+7, and so on.

It should be noted that the foregoing location type 1 and location type 2 are merely examples, and do not represent all location types of time-domain locations.

Based on the foregoing location type 1 and location type 2, the following describes step 202 in two cases.

Case 1: It is assumed that, in step 202, the terminal device receives first indication information sent by the network device, and determines, based on the first indication information, that a location type of the time-domain location of the broadcast channel carrying the broadcast information is the location type 1. The terminal device receives a reference signal of the broadcast channel sent by the network device, and the reference signal of the broadcast channel includes second indication information with a value of 5. In this case, the terminal device determines, from the eight time-domain locations corresponding to the location type 1, a 5th time-domain location as the time-domain location of the broadcast channel carrying the broadcast information.

Case 2: It is assumed that, in step 202, the terminal device receives first indication information sent by the network device, and determines, based on the first indication information, that a location type of the time-domain location of the broadcast channel carrying the broadcast information is the location type 2. The terminal device receives a reference signal and a MIB of the broadcast channel sent by the network device, and the value of the second indication information jointly indicated by the reference signal and the MIB of the broadcast channel is 32. In this case, the terminal device determines, from the 64 time-domain locations corresponding to the location type 2, a $32^{nd}$ time-domain location as the time-domain location of the broadcast channel carrying the broadcast information.

Step 203: The terminal device determines a time-domain location of a control channel based on the time-domain location of the broadcast channel.

In step 203, the time-domain location of the broadcast channel is the time-domain location of the broadcast channel carrying the broadcast information, determined in step 202.

The time-domain location of the control channel is a location relative to a timeslot boundary, and the timeslot boundary is usually a start boundary of a timeslot (or referred to as a left boundary of the timeslot). The timeslot boundary in this embodiment may alternatively be an end boundary of the timeslot (or referred to as a right boundary of the timeslot). For example, a start symbol of a timeslot is a symbol with a number 0, and the timeslot boundary is usually a left boundary of the symbol with the number 0. That the timeslot boundary is a start boundary of a timeslot is used as an example. That the time-domain location of the control channel is a location relative to a timeslot boundary can be understood as: that the time-domain location of the control channel is a location relative to the start boundary of the timeslot. In this case, if the time-domain location of the control channel is a 5th symbol in the timeslot, the time-domain location of the control channel is the $5^{th}$ symbol relative to the start boundary of the timeslot.

In this embodiment, there may be a plurality of methods for the terminal device to determine the time-domain location of the control channel based on the time-domain location of the broadcast channel. The following uses three of the plurality of methods as examples to describe step 203.

First method: In step 203, the terminal device determines an offset based on the time-domain location of the broadcast channel, where the offset is a time-domain offset between the time-domain location of the control channel and the time-domain location of the broadcast channel carrying the broadcast information. The offset is usually indicated by a quantity of symbols shifted to left or a quantity of symbols shifted to right. The terminal device determines the time-domain location of the control channel based on the offset and the time-domain location of the broadcast channel carrying the broadcast information. To be specific, a time-domain location obtained by the terminal device by adding the offset to or subtracting the offset from the time-domain location of the broadcast channel carrying the broadcast information is the time-domain location of the control channel.

In the first method, a correspondence between the time-domain location of the broadcast channel and the offset determined based on the time-domain location of the broadcast channel is preset. The correspondence may be protocol-specified. In this case, the correspondence is known to the network device and the terminal device. Alternatively, the network device sends the correspondence to the terminal device after determining the correspondence. The correspondence between the time-domain location of the broadcast channel and the offset determined based on the time-domain location of the broadcast channel is determined when the time-domain location of the broadcast channel and the time-domain location of the control channel are preconfigured. One time-domain location of the broadcast channel is corresponding to one offset, or a plurality of time-domain locations of the broadcast channel is corresponding to one offset. This is not limited in this embodiment. Therefore, in this embodiment, the time-domain location of the broadcast channel and the time-domain location of the control channel need to be preconfigured. The following describes preconfiguration of the time-domain location of the broadcast channel and the time-domain location of the control channel.

For example, it is assumed that the time-domain location of the broadcast channel carrying the broadcast information is a symbol with a number 3 in a timeslot T, and that the offset corresponding to the time-domain location of the broadcast channel is 1 symbol shifted to right. Then, the time-domain location of the control channel is a symbol with a number 4 in the timeslot T.

By using the first method, the terminal device may determine the time-domain location of the control channel based on the time-domain location of the broadcast channel and the offset corresponding to the time-domain location of the broadcast channel, and therefore the broadcast information does not need to carry information used for indicating the time-domain location of the control channel, thereby reducing signaling overheads of the broadcast information.

Second method: In step 203, the terminal device determines the time-domain location of the control channel based on a correspondence between the time-domain location of the broadcast channel and the time-domain location of the control channel.

The correspondence between the time-domain location of the broadcast channel and the time-domain location of the control channel is preset. The correspondence may be protocol-specified. In this case, the correspondence is known to the network device and the terminal device. Alternatively, the network device sends the correspondence to the terminal device after determining the correspondence. The correspondence between the time-domain location of the broadcast channel and the time-domain location of the control channel is determined when the time-domain location of the broadcast channel and the time-domain location of the control channel are preconfigured. Therefore, in this embodiment, the time-domain location of the broadcast channel and the time-domain location of the control channel need to be preconfigured. The following describes preconfiguration of the time-domain location of the broadcast channel and the time-domain location of the control channel.

For example, it is assumed that the correspondence between the time-domain location of the broadcast channel and the time-domain location of the control channel is shown in Table 1. Each row in Table 1 represents one correspondence between the time-domain location of the broadcast channel and the time-domain location of the control channel. When the terminal device determines, in step 202, that the time-domain location of the broadcast channel carrying the broadcast information is symbols with numbers 2 to 5, it can be learned from Table 1 that the time-domain location of the control channel is 0 to 1. In this case, it is assumed that a subcarrier width of the broadcast channel and a subcarrier width of the control channel are both 15 kHz.

TABLE 1

| Subcarrier width covered by a resource in which the broadcast channel is located | Time-domain location (number of symbol) of the broadcast channel | Subcarrier width covered by a resource in which the control channel is located | Time-domain location (number of symbol) of the control channel |
|---|---|---|---|
| 15 kHz | 2 to 5 | 15 kHz | 0 to 1 |
| 15 kHz | 8 to 9 | 15 kHz | 7 |
| 30 kHz | 4 to 7 | 30 kHz | 0 to 1 |
| 30 kHz | 8 to 11 | 30 kHz | 2 to 3 |

It should be noted that correspondences, listed in Table 1, between the time-domain location of the broadcast channel and the time-domain location of the control channel are merely examples, and do not represent all correspondences between the time-domain location of the broadcast channel and the time-domain location of the control channel.

By using the second method, the terminal device may determine the time-domain location of the control channel based on the time-domain location of the broadcast channel and the preset correspondence between the time-domain location of the broadcast channel and the time-domain location of the control channel, and the broadcast information does not need to carry information used for indicating the time-domain location of the control channel, thereby reducing signaling overheads of the broadcast information.

Third method: In step 203, the terminal device determines the time-domain location of the control channel from a time-domain resource set based on the time-domain location of the broadcast channel.

When the broadcast information includes indication information used for indicating a time-domain resource set of the control channel, the terminal device may determine, based on the indication information, a time-domain resource set in which the time-domain location of the control channel is located, and determine, from the time-domain resource set based on the time-domain location of the broadcast channel, the time-domain location of the control channel corresponding to the time-domain location of the broadcast channel.

For example, it is assumed that there is an optional time-domain resource set 0 and an optional time-domain resource set 1. The time-domain resource set 0 includes a symbol A and a symbol B, and the time-domain resource set 1 includes a symbol C and a symbol D. Time-domain locations of the broadcast channel corresponding to the symbols A, B, C, and D are sequentially locations 0, 1, 2, and 3. If the indication information is used to indicate the time-domain resource set 0 of the control channel, the time-domain location of the broadcast channel is the location 0. In this case, the terminal device determines, from the time-domain resource set 0 based on the indication information and the time-domain location of the broadcast channel, the symbol A as the time-domain location of the control channel corresponding to the time-domain location (that is, the location 0) of the broadcast channel.

By using the third method, the terminal device may determine the time-domain location of the control channel from the time-domain resource set based on the time-domain location of the broadcast channel, and the broadcast information does not need to carry information used for indicating the time-domain location of the control channel, thereby reducing signaling overheads of the broadcast information.

In this embodiment, if a subcarrier width of the control channel is considered during preconfiguration of the time-domain location of the broadcast channel and the time-domain location of the control channel, that is, if the time-domain location of the control channel is jointly determined by the time-domain location of the broadcast channel and the subcarrier width of the control channel, the network device sends the subcarrier width of the control channel to the terminal device. In this case, the terminal device determines the time-domain location of the control channel based on the subcarrier width of the control channel and the time-domain location of the broadcast channel carrying the broadcast information.

For example, the correspondence between the time-domain location of the broadcast channel and the time-domain location of the control channel is shown in Table 2. When the terminal device determines, in step 202, that the time-domain location of the broadcast channel carrying the broadcast information is symbols with numbers 2 to 5, if the subcarrier width of the control channel is 15 kHz, it can be learned from Table 2 that the time-domain location of the control channel is a symbol with a number 0; and if the subcarrier width of the control channel is 30 kHz, it can be learned from Table 2 that the time-domain location of the control channel is a symbol with a number 1.

TABLE 2

| Subcarrier width covered by a resource in which the broadcast channel is located | Time-domain location (number of symbol) of the broadcast channel | Subcarrier width covered by a resource in which the control channel is located | Time-domain location (number of symbol) of the control channel |
| --- | --- | --- | --- |
| 15 kHz | 2 to 5 | 15 kHz | 0 |
|  |  | 30 kHz | 1 |
| 30 kHz | 4 to 7 | 15 kHz | 6 to 7 |
|  |  | 30 kHz | 2 to 3 |

After determining the time-domain location of the control channel in step 203, the terminal device performs step 204.

Step 204: The terminal device performs control channel detection in the time-domain location of the control channel.

Before step 204, the terminal device also needs to know a frequency-domain location of the control channel, and then the terminal device determines a time-frequency location of the control channel based on the time-domain location of the control channel and the frequency-domain location of the control channel. Therefore, in step 204, the terminal device performs control channel detection in the time-frequency location of the control channel. A method in the prior art may be used for performing control channel detection by the terminal device in the time-frequency location of the control channel, and details are not described herein. A method in the prior art can be used for determining the frequency-domain location of the control channel by the terminal device. For example, the terminal device may determine the frequency-domain location of the control channel based on information that is about the frequency-domain location of the control channel and that is included in the broadcast information. Details are not described herein.

In this embodiment, the time-domain location of the broadcast channel and the time-domain location of the control channel need to be preconfigured. Through this preconfiguration process, a correspondence between a time-domain location of any broadcast channel and a time-domain location, determined based on the time-domain location of the broadcast channel, of a control channel is learned. Certainly, in this embodiment, preconfiguration of the time-domain location of the broadcast channel and the time-domain location of the control channel is not randomly performed. One of the following options needs to be true between a time-domain location of any broadcast channel and a time-domain location, determined based on the time-domain location of the broadcast channel, of a control channel:

First option: The time-domain location of the control channel is orthogonal to a time-domain location of the broadcast channel and a synchronization signal corresponding to the broadcast channel.

In the first option, the time-domain location of the control channel is orthogonal to the time-domain location of the broadcast channel, and the time-domain location of the control channel is orthogonal to the time-domain location of the synchronization signal corresponding to the broadcast channel.

Second option: The time-domain location of the control channel is the same or partially the same as a time-domain location of the broadcast channel and a synchronization signal corresponding to the broadcast channel.

In the second option, the time-domain location of the control channel is the same as the time-domain location of the broadcast channel, or the time-domain location of the control channel is the same as a portion of the time-domain location of the broadcast channel. The time-domain location of the control channel is the same as the time-domain location of the synchronization signal corresponding to the broadcast channel, or the time-domain location of the control channel is the same as a portion of the time-domain location of the synchronization signal corresponding to the broadcast channel.

Third option: A portion of the time-domain location of the control channel is orthogonal to a time-domain location of the broadcast channel and a synchronization signal corresponding to the broadcast channel, and the other portion of the time-domain location of the control channel is the same or partially the same as a time-domain location of the broadcast channel and the synchronization signal corresponding to the broadcast channel.

In the third option, a portion of the time-domain location of the control channel is orthogonal to the time-domain location of the broadcast channel, and the other portion of the time-domain location of the control channel may be exactly the same as the time-domain location of the broadcast channel. Alternatively, a portion of the time-domain location of the control channel is orthogonal to the time-domain location of the broadcast channel, and the other portion of the time-domain location of the control channel may be partially the same as the time-domain location of the broadcast channel. Alternatively, a portion of the time-domain location of the control channel is orthogonal to the time-domain location of the synchronization signal corresponding to the broadcast channel, and the other portion of the time-domain location of the control channel may be exactly the same as the time-domain location of the synchronization signal corresponding to the broadcast channel. Alternatively, a portion of the time-domain location of the control channel is orthogonal to the time-domain location of the synchronization signal corresponding to the broadcast channel, and the other portion of the time-domain location of the control channel may be partially the same as the time-domain location of the synchronization signal corresponding to the broadcast channel.

When one of the foregoing options is true between a time-domain location of any broadcast channel and a time-domain location, determined based on the time-domain location of the broadcast channel, of a control channel, the correspondence between the time-domain location of the broadcast channel and the time-domain location, determined based on the time-domain location of the broadcast channel, of the control channel is described below by using examples.

Figure 3:
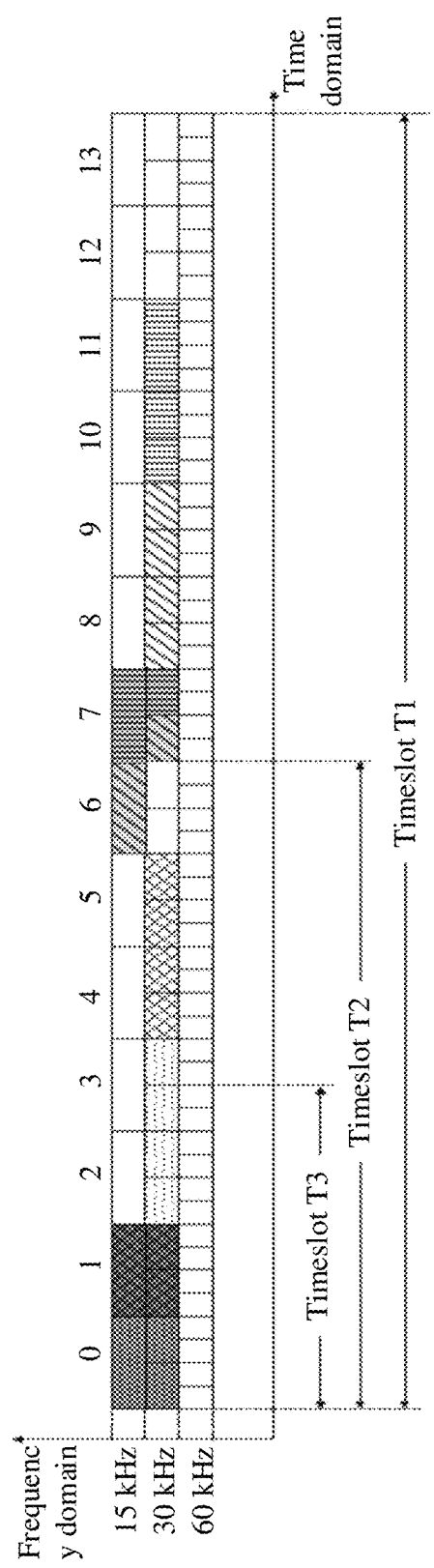
FIG. 3 is a schematic architectural diagram of a subframe according to an embodiment of this application.

In a first example, taking a subframe structure shown in FIG. 3 as an example, the correspondence between the time-domain location of the broadcast channel and the time-domain location of the control channel is described by using three different subcarrier widths with.

When subcarrier widths covered by resources in which the broadcast channel and the control channel are located are both 15 kHz, if the time-domain location of the broadcast channel is symbols with numbers 2 to 5, the time-domain location of the control channel is symbols with numbers 0 to 1; and if the time-domain location of the broadcast channel carrying the broadcast information is symbols with numbers 8 to 11, the time-domain location of the control channel is a symbol with a number 7.

When subcarrier widths covered by resources in which the broadcast channel and the control channel are located are both 30 kHz, if the time-domain location of the broadcast channel carrying the broadcast information is symbols with numbers 4 to 7 in a $1^{st}$ timeslot, the time-domain location of the control channel is symbols with numbers 0 to 1 in the $1^{st}$ timeslot; if the time-domain location of the broadcast channel carrying the broadcast information is symbols with numbers 8 to 11 in the $1^{st}$ timeslot, the time-domain location of the control channel is symbols with numbers 2 to 3 in the $1^{st}$ timeslot; if the time-domain location of the broadcast channel carrying the broadcast information is symbols with numbers 2 to 5 in a $2^{nd}$ timeslot, the time-domain location of the control channel is a symbol with a number 0 in the $2^{nd}$ timeslot; and if the time-domain location of the broadcast channel carrying the broadcast information is symbols with numbers 6 to 9 in the $2^{nd}$ timeslot, the determined time-domain location of the control channel is a symbol with a number 1 in the $2^{nd}$ timeslot.

When subcarrier widths covered by resources in which the broadcast channel and the control channel are located are both 60 kHz, if the time-domain location of the broadcast channel carrying the broadcast information is symbols with numbers 8 to 11 in a $1^{st}$ timeslot, the time-domain location of the control channel is symbols with numbers 0 to 1 in the Pt timeslot; if the time-domain location of the broadcast channel carrying the broadcast information is symbols with numbers 12 to 13 in the $1^{st}$ timeslot and symbols with numbers 0 to 1 in a $2^{nd}$ timeslot, the time-domain location of the control channel is symbols with numbers 2 to 3 in the $1^{st}$ timeslot; if the time-domain location of the broadcast channel carrying the broadcast information is symbols with numbers 6 to 9 in the $2^{nd}$ timeslot, the time-domain location of the control channel is symbols with numbers 6 to 7 in the $1^{st}$ timeslot; if the time-domain location of the broadcast channel carrying the broadcast information is symbols with numbers 4 to 7 in a $3^{rd}$ timeslot, the determined time-domain location of the control channel is a symbol with a number 0 in the $3^{rd}$ timeslot; and if the time-domain location of the broadcast channel carrying the broadcast information is symbols with numbers 8 to 11 in the $3^{rd}$ timeslot, the determined time-domain location of the control channel is a symbol with a number 1 in the $3^{rd}$ timeslot; if the time-domain location of the broadcast channel carrying the broadcast information is symbols with numbers 12 to 13 in the $3^{rd}$ timeslot and symbols with numbers 0 to 1 in $4^{th}$ timeslot, the determined time-domain location of the control channel is a symbol with a number 2 in the $3^{rd}$ timeslot; and if the time-domain location of the broadcast channel carrying the broadcast information is symbols with numbers 2 to 5 in the $4^{th}$ timeslot, the determined time-domain location of the control channel is a symbol with a number 3 in the $3^{rd}$ timeslot.

Figure 4:
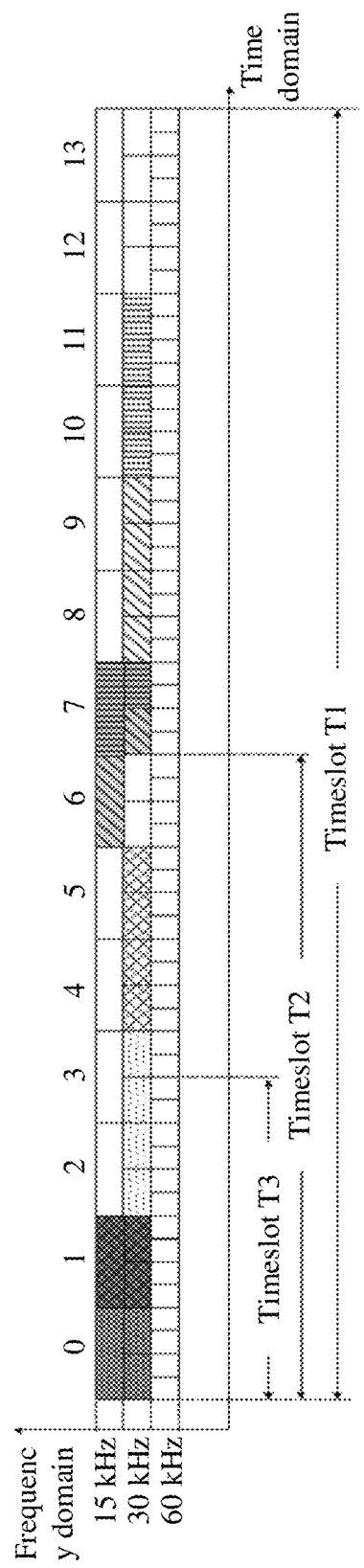
FIG. 4 is a schematic architectural diagram of another subframe according to an embodiment of this application.

In a second example, taking a subframe structure shown in FIG. 4 as an example, the following several correspondences between the time-domain location of the broadcast channel and the time-domain location of the control channel are included. It is assumed that a subcarrier width covered by a resource in which the broadcast channel is located is 30 kHz.

If the time-domain location of the broadcast channel carrying the broadcast information is symbols with numbers 4 to 7 in a $1^{st}$ timeslot, a time-domain location of a control channel with a covered subcarrier width 15 kHz is a symbol with a number 0; a time-domain location of a control channel with a covered subcarrier width 30 kHz is a symbol with a number 0 in a $1^{st}$ timeslot; and a time-domain location of a control channel with a covered subcarrier width 60 kHz is symbols with number 0 and 1 in a $1^{st}$ timeslot.

If the time-domain location of the broadcast channel carrying the broadcast information is symbols with numbers 8 to 11 in the $1^{st}$ timeslot, the time-domain location of the control channel with a covered subcarrier width 15 kHz is a symbol with a number 1; the time-domain location of the control channel with a covered subcarrier width 30 kHz is symbols with numbers 2 to 3 in the $1^{st}$ timeslot; and the time-domain location of the control channel with a covered subcarrier width 60 kHz is symbols with numbers 2 and 3 in the $1^{st}$ timeslot.

If the time-domain location of the broadcast channel carrying the broadcast information is symbols with numbers 2 to 5 in a $2^{nd}$ timeslot, a time-domain location of a control channel of a higher half of a frequency band with a covered subcarrier width 15 kHz is a symbol with a number 7; the time-domain location of the control channel with a covered subcarrier width 30 kHz is a symbol with a number 0 in a $2^{nd}$ timeslot; and the time-domain location of the control channel with a covered subcarrier width 60 kHz is a symbol with a number 1 in a $3^{rd}$ timeslot.

If the time-domain location of the broadcast channel carrying the broadcast information is symbols with numbers 6 to 9 in the $2^{nd}$ timeslot, a time-domain location of a control channel of a lower half of the frequency band with a covered subcarrier width 15 kHz is the symbol with the number 7; the time-domain location of the control channel with a covered subcarrier width 30 kHz is a symbol with a number 1 in the $2^{nd}$ timeslot; and the time-domain location of the control channel with a covered subcarrier width 60 kHz is the symbol with the number 1 in the $3^{rd}$ timeslot.

In a possible implementation, the terminal device receives system information, where the system information includes a time-frequency resource of another control channel different from the control channel. The system information includes but is not limited to time-domain location indication information. The time-domain location indication information herein is similar to the time-domain location indication information in the foregoing step 202. Refer to related descriptions of the time-domain location indication information in step 202, and details are not described herein again. By using the foregoing method, the terminal device may perform control channel detection in the time-domain location of the control channel, so that rate matching can be performed during control channel detection by the terminal device, thereby avoiding a control information transmission failure caused by interference from another control channel and ensuring performance of control information transmission.

This embodiment of this application provides the control information receiving method. The network device indicates the time-frequency location of the control channel to the terminal device, and the terminal device performs control channel detection in the time-frequency location of the control channel. Compared with a technical solution that a network device indicates a time-frequency location of a control channel to a terminal device in an existing LTE system, the technical solution provided in this embodiment of this application can reduce signaling overheads for indicating the time-domain location of the control channel, thereby reducing the signaling overheads of the broadcast information.

Figure 5:
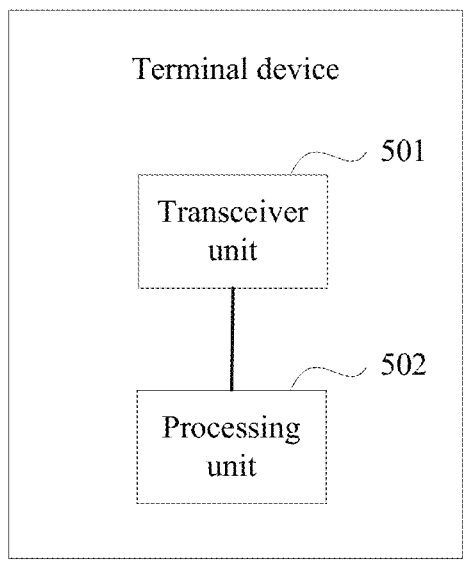
FIG. 5 is a schematic structural diagram of a terminal device according to an embodiment of this application.

Based on a same inventive concept, an embodiment of this application further provides a terminal device. The terminal device is capable of implementing the method performed by the terminal device in the method provided in the embodiment corresponding to FIG. 2. Referring to FIG. 5, the terminal device includes: a transceiver unit 501 and a processing unit 502.

The transceiver unit 501 is configured to receive broadcast information.

The processing unit 502 is configured to determine, from at least two predefined time-domain locations, a time-domain location of a broadcast channel carrying the broadcast information that is received by the transceiver unit 501, where the time-domain location of the broadcast channel is a location relative to a timeslot boundary; and determine a time-domain location of a control channel based on the time-domain location of the broadcast channel, where the time-domain location of the control channel is a location relative to the timeslot boundary.

The transceiver unit 501 is further configured to perform control channel detection in the time-domain location of the control channel.

In a possible implementation, when determining the time-domain location of the control channel based on the time-domain location of the broadcast channel, the processing unit 502 is configured to: determine an offset based on the time-domain location of the broadcast channel; and determine the time-domain location of the control channel based on the offset.

In a possible implementation, when determining the time-domain location of the control channel based on the time-domain location of the broadcast channel, the processing unit 502 is configured to: determine the time-domain location of the control channel based on a correspondence between the time-domain location of the broadcast channel and the time-domain location of the control channel.

In a possible implementation, one of the following options is true between the time-domain location of the broadcast channel and the time-domain location, determined based on the time-domain location of the broadcast channel, of the control channel: The time-domain location of the control channel is orthogonal to a time-domain location of the broadcast channel and a synchronization signal corresponding to the broadcast channel; the time-domain location of the control channel is the same or partially the same as a time-domain location of the broadcast channel and a synchronization signal corresponding to the broadcast channel; and a portion of the time-domain location of the control channel is orthogonal to a time-domain location of the broadcast channel and a synchronization signal corresponding to the broadcast channel, and the other portion of the time-domain location of the control channel is the same or partially the same as the time-domain location of the broadcast channel and the synchronization signal corresponding to the broadcast channel.

In a possible implementation, the broadcast information includes information used for indicating a subcarrier width used by a resource in which the control channel is located. When determining the time-domain location of the control channel based on the time-domain location of the broadcast channel, the processing unit 502 is configured to: determine the time-domain location of the control channel based on the time-domain location of the broadcast channel and the subcarrier width used by the resource in which the control channel is located.

In a possible implementation, the broadcast information includes indication information used for indicating a time-domain resource set of a control channel. When determining the time-domain location of the control channel based on the time-domain location of the broadcast channel, the processing unit 502 is configured to: determine the time-domain location of the control channel from the time-domain resource set based on the time-domain location of the broadcast channel.

In a possible implementation, a reference signal of the broadcast channel is QCL with a reference signal of the control channel, and/or the reference signal of the broadcast channel is QCL with a synchronization signal of the control channel.

In a possible implementation, the transceiver unit 501 is further configured to receive system information, where the system information includes a time-frequency resource of another control channel different from the control channel.

It should be noted that the unit division in this embodiment of this application is an example, and is merely logical function division and may be other division in actual implementation. The functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solution of this application essentially, or the part contributing to the prior art, or all or a part of the technical solution may be implemented in the form of a software product. The software product is stored in a storage medium and includes several instructions for instructing a computer device (which may be a personal computer, a server, or a network device) or a processor to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

Figure 6:
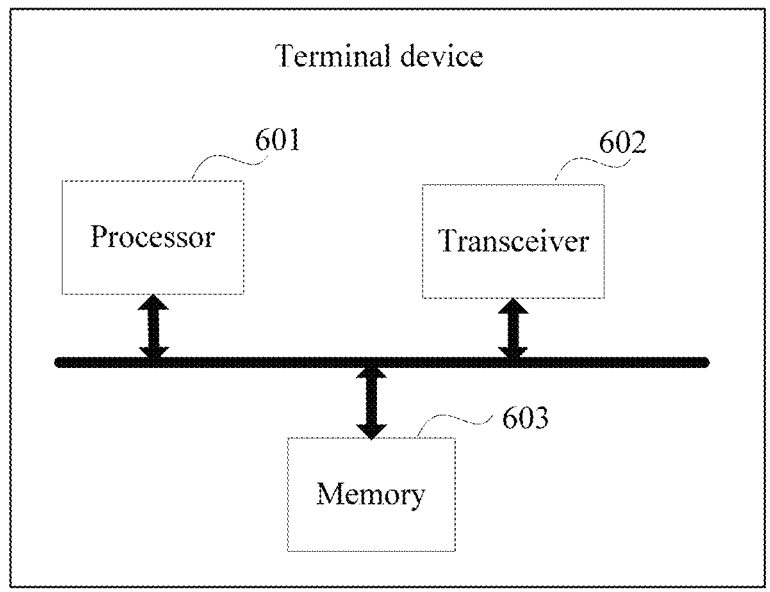
FIG. 6 is a schematic structural diagram of another terminal device according to an embodiment of this application.

Based on a same inventive concept, an embodiment of this application further provides a terminal device. The terminal device uses the method performed by the terminal device in the method provided in the embodiment corresponding to FIG. 2, and may be a same device as the terminal device shown in FIG. 5. Referring to FIG. 6, the terminal device includes a processor 601, a transceiver 602, and a memory 603.

The processor 601 is configured to read a program in the memory 603 and perform the following process:

The processor 601 is configured to receive broadcast information by using the transceiver 602.

The processor 601 is further configured to: determine, from at least two predefined time-domain locations, a time-domain location of a broadcast channel carrying the broadcast information that is received by the transceiver 602, where the time-domain location of the broadcast channel is a location relative to a timeslot boundary; and determine a time-domain location of a control channel based on the time-domain location of the broadcast channel, where the time-domain location of the control channel is a location relative to the timeslot boundary.

The processor 601 is further configured to detect, by using the transceiver 602, the control channel in the time-domain location of the control channel.

The transceiver 602 is configured to receive and send data under control of the processor 601. The transceiver 602 may alternatively be a communications module, and the communications module includes a communications interface used for receiving data and/or sending data.

In a possible implementation, when determining the time-domain location of the control channel based on the time-domain location of the broadcast channel, the processor 601 is configured to: determine an offset based on the time-domain location of the broadcast channel; and determine the time-domain location of the control channel based on the offset.

In a possible implementation, when determining the time-domain location of the control channel based on the time-domain location of the broadcast channel, the processor 601 is configured to: determine the time-domain location of the control channel based on a correspondence between the time-domain location of the broadcast channel and the time-domain location of the control channel.

In a possible implementation, one of the following options is true between the time-domain location of the broadcast channel and the time-domain location, determined based on the time-domain location of the broadcast channel, of the control channel: The time-domain location of the control channel is orthogonal to a time-domain location of the broadcast channel and a synchronization signal corresponding to the broadcast channel; the time-domain location of the control channel is the same or partially the same as a time-domain location of the broadcast channel and a synchronization signal corresponding to the broadcast channel; and a portion of the time-domain location of the control channel is orthogonal to a time-domain location of the broadcast channel and a synchronization signal corresponding to the broadcast channel, and the other portion of the time-domain location of the control channel is the same or partially the same as the time-domain location of the broadcast channel and the synchronization signal corresponding to the broadcast channel.

In a possible implementation, the broadcast information includes information used for indicating a subcarrier width used by a resource in which the control channel is located. When determining the time-domain location of the control channel based on the time-domain location of the broadcast channel, the processor 601 is configured to: determine the time-domain location of the control channel based on the time-domain location of the broadcast channel and the subcarrier width used by the resource in which the control channel is located.

In a possible implementation, the broadcast information includes indication information used for indicating a time-domain resource set of a control channel. When determining the time-domain location of the control channel based on the time-domain location of the broadcast channel, the processor 601 is configured to: determine the time-domain location of the control channel from the time-domain resource set based on the time-domain location of the broadcast channel.

In a possible implementation, a reference signal of the broadcast channel is QCL with a reference signal of the control channel, and/or the reference signal of the broadcast channel is QCL with a synchronization signal of the control channel.

In a possible implementation, the processor 601 is further configured to receive system information by using the transceiver 602, where the system information includes a time-frequency resource of another control channel different from the control channel.

The processor 601, the transceiver 602, and the memory 603 are connected to each other by using a bus. The bus may be a peripheral component interconnect (PCI) bus, an extended industry standard architecture (EISA) bus, or the like. The bus may be classified into an address bus, a data bus, a control bus, and the like.

In FIG. 6, a bus architecture may include any quantity of interconnected buses and bridges, and connects circuits that are of one or more processors represented by the processor 601 and of a memory represented by the memory 603. The bus architecture may further connect various other circuits such as a peripheral device, a voltage stabilizer, and a power management circuit. These are well known in the art, and therefore are not further described in this specification. The bus interface provides an interface. The transceiver 602 may be a plurality of components, including a transmitter and a transceiver, and provides units configured for communicating with various other apparatuses on a transmission medium. The processor 601 is responsible for management of the bus architecture and general processing, and the memory 603 may store data that is used by the processor 601 during an operation.

Optionally, the processor 601 may be a central processing unit, an application-specific integrated circuit (ASIC), or a field programmable gate array (FPGA) or complex programmable logic device (CPLD).

Figure 7:
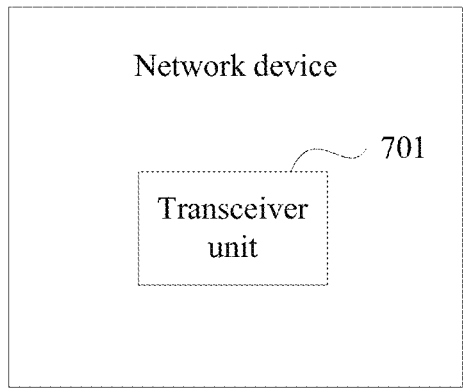
FIG. 7 is a schematic structural diagram of a network device according to an embodiment of this application.

Based on a same inventive concept, an embodiment of this application further provides a network device. The network device is capable of implementing the method performed by the network device in the method provided in the embodiment corresponding to FIG. 2. Referring to FIG. 7, the network device includes a transceiver unit 701.

The transceiver unit 701 is configured to send broadcast information, and send a control channel to a terminal device in a time-domain location of the control channel.

The time-domain location of the control channel is a location relative to a timeslot boundary, the time-domain location of the control channel is determined based on a time-domain location of a broadcast channel carrying the broadcast information, and the time-domain location of the broadcast channel is a location relative to the timeslot boundary.

In a possible implementation, one of the following options is true between the time-domain location of the broadcast channel and the time-domain location, determined based on the time-domain location of the broadcast channel, of the control channel:

the time-domain location of the control channel is orthogonal to a time-domain location of the broadcast channel and a synchronization signal corresponding to the broadcast channel;

the time-domain location of the control channel is the same or partially the same as a time-domain location of the broadcast channel and a synchronization signal corresponding to the broadcast channel; and a portion of the time-domain location of the control channel is orthogonal to a time-domain location of the broadcast channel and a synchronization signal corresponding to the broadcast channel, and the other portion of the time-domain location of the control channel is the same or partially the same as the time-domain location of the broadcast channel and the synchronization signal corresponding to the broadcast channel.

In a possible implementation, the broadcast information includes information used for indicating a subcarrier width used by a resource in which the control channel is located.

That the time-domain location of the control channel is determined based on the time-domain location of the broadcast channel carrying the broadcast information is:

that the time-domain location of the control channel is determined based on the time-domain location of the broadcast channel carrying the broadcast information and based on the subcarrier width used by the resource in which the control channel is located.

In a possible implementation, the broadcast information includes indication information used for indicating a time-domain resource set of a control channel.

In a possible implementation, a reference signal of the broadcast channel is QCL with a reference signal of the control channel, and/or the reference signal of the broadcast channel is QCL with a synchronization signal of the control channel.

In a possible implementation, the transceiver unit 701 is further configured to send system information to the terminal device, where the system information includes a time-frequency resource of another control channel different from the control channel.

It should be noted that the unit division in this embodiment of this application is an example, and is merely logical function division and may be other division in actual implementation. The functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solution of this application essentially, or the part contributing to the prior art, or all or a part of the technical solution may be implemented in the form of a software product. The software product is stored in a storage medium and includes several instructions for instructing a computer device (which may be a personal computer, a server, or a network device) or a processor to perform all or some of the steps of the method described in the embodiments of this application. The foregoing storage medium includes: any medium that can store program code, such as a USB flash drive, a removable hard disk, a ROM, a RAM, a magnetic disk, or an optical disc.

Figure 8:
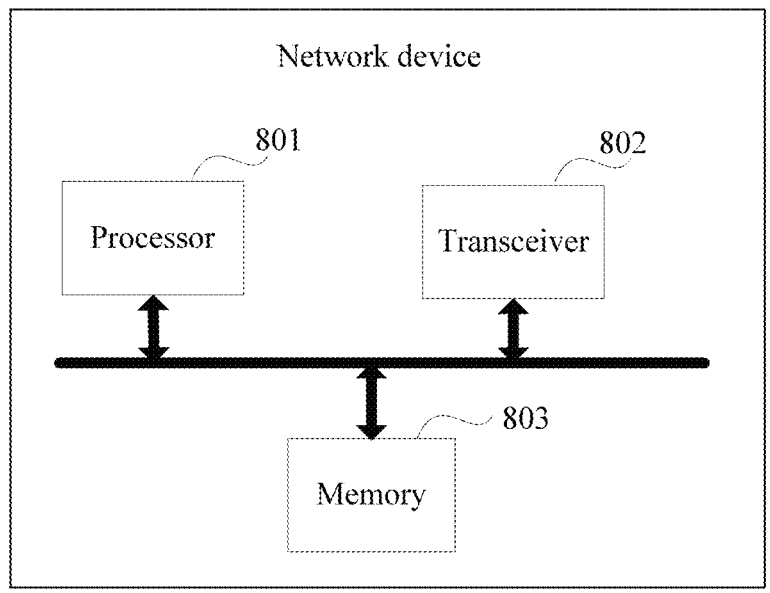
FIG. 8 is a schematic structural diagram of another network device according to an embodiment of this application.

Based on a same inventive concept, an embodiment of this application further provides a network device. The network device uses the method performed by the network device in the method provided in the embodiment corresponding to FIG. 2, and may be a same device as the network device shown in FIG. 7. Referring to FIG. 8, the network device includes a processor 801, a transceiver 802, and a memory 803.

The processor 801 is configured to read a program in the memory 803 and perform the following process.

The processor 801 is further configured to send broadcast information by using the transceiver 802, and send a control channel to a terminal device in a time-domain location of the control channel, where the time-domain location of the control channel is a location relative to a timeslot boundary, the time-domain location of the control channel is determined based on a time-domain location of a broadcast channel carrying the broadcast information, and the time-domain location of the broadcast channel is a location relative to the timeslot boundary.

The transceiver 802 is configured to receive and send data under control of the processor 801. The transceiver 802 may alternatively be a communications module, and the communications module includes a communications interface used for receiving data and/or sending data.

In a possible implementation, one of the following options is true between the time-domain location of the broadcast channel and the time-domain location, determined based on the time-domain location of the broadcast channel, of the control channel:

the time-domain location of the control channel is orthogonal to a time-domain location of the broadcast channel and a synchronization signal corresponding to the broadcast channel;

the time-domain location of the control channel is the same or partially the same as a time-domain location of the broadcast channel and a synchronization signal corresponding to the broadcast channel; and a portion of the time-domain location of the control channel is orthogonal to a time-domain location of the broadcast channel and a synchronization signal corresponding to the broadcast channel, and the other portion of the time-domain location of the control channel is the same or partially the same as the time-domain location of the broadcast channel and the synchronization signal corresponding to the broadcast channel.

In a possible implementation, the broadcast information includes information used for indicating a subcarrier width used by a resource in which the control channel is located.

That the time-domain location of the control channel is determined based on the time-domain location of the broadcast channel carrying the broadcast information is:

that the time-domain location of the control channel is determined based on the time-domain location of the broadcast channel carrying the broadcast information and based on the subcarrier width used by the resource in which the control channel is located.

In a possible implementation, the broadcast information includes indication information used for indicating a time-domain resource set of a control channel.

In a possible implementation, a reference signal of the broadcast channel is QCL with a reference signal of the control channel, and/or the reference signal of the broadcast channel is QCL with a synchronization signal of the control channel.

In a possible implementation, the processor 801 is further configured to send system information to the terminal device by using the transceiver 802, where the system information includes a time-frequency resource of another control channel different from the control channel.

The processor 801, the transceiver 802, and the memory 803 are connected to each other by using a bus. The bus may be a PCI bus, an EISA bus, or the like. The bus may be classified into an address bus, a data bus, a control bus, and the like.

In FIG. 8, a bus architecture may include any quantity of interconnected buses and bridges, and connects circuits that are of one or more processors represented by the processor 801 and of a memory represented by the memory 803. The bus architecture may further connect various other circuits such as a peripheral device, a voltage stabilizer, and a power management circuit. These are well known in the art, and therefore are not further described in this specification. The bus interface provides an interface. The transceiver 802 may be a plurality of components, including a transmitter and a transceiver, and provides units configured for communicating with various other apparatuses on a transmission medium. The processor 801 is responsible for management of the bus architecture and general processing, and the memory 803 may store data that is used by the processor 801 during an operation.

Optionally, the processor 801 may be a central processing unit, an ASIC, an FPGA, or a CPLD.

An embodiment of this application provides a computer storage medium. The storage medium stores a software program. When the software program is read and executed by one or more processors, the control information receiving method performed by the terminal device in the foregoing embodiments can be implemented, or when the software program is read and executed by one or more processors, the control information sending method performed by the network device in the foregoing embodiments can be implemented.

An embodiment of this application further provides a control information receiving apparatus. The apparatus includes a chip. The chip is configured to execute the method performed by the terminal device in the foregoing control information receiving method, and the chip performs, by using a transceiver (or a communications module), the method in which the terminal device receives data and/or information in the foregoing control information receiving method. Alternatively, the chip is configured to execute the method performed by the network device in the foregoing control information sending method, and the chip performs, by using the transceiver (or the communications module), the method in which the network device transmits data and/or information in the foregoing control information sending method.

An embodiment of this application provides a computer program product that includes an instruction. When the program runs on a computer, the computer is enabled to perform the control information receiving method performed by the terminal device in the foregoing embodiments, or the computer is enabled to perform the control information sending method performed by the network device in the foregoing embodiments.

Figure 9:
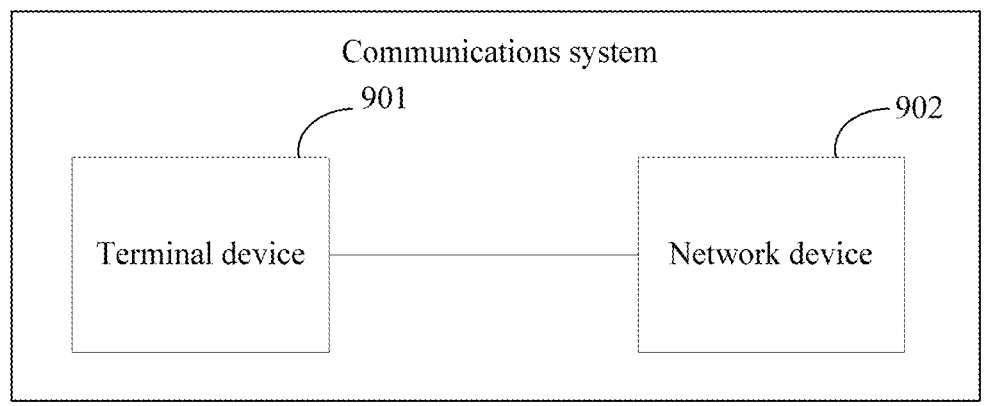
FIG. 9 is a schematic structural diagram of a communications system according to an embodiment of this application.

Based on a same inventive concept, an embodiment of this application further provides a communications system. As shown in FIG. 9, the communications system includes a terminal device 901 and a network device 902. The terminal device 901 is configured to perform the method performed by the terminal device in the method provided in the embodiment corresponding to FIG. 2, and the terminal device 901 may be a same device as the terminal device shown in FIG. 5 or FIG. 6. The network device 902 is configured to perform the method provided in the network device in the method provided in the embodiment corresponding to FIG. 2, and the network device 902 may be a same device as the network device shown in FIG. 7 or FIG. 8. The communications system can implement the control information receiving method and the control information sending method that are provided in the embodiments of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control information receiving method comprising:
   receiving broadcast information carried in a broadcast channel, wherein the broadcast information includes indication information used for indicating a time-domain resource set of control channels, and the broadcast information is located in a synchronization signal block;
   determining a time-domain location of a control channel in a timeslot from the time-domain resource set based on a time-domain location of the synchronization signal block in a timeslot, wherein the time-domain location of the synchronization signal block is one of at least two predefined time-domain locations in at least one timeslot; and
   performing control channel detection in the time-domain location of the control channel.

2. The method according to claim 1, wherein there are at least two predefined time-domain locations in the timeslot in which the synchronization signal block is located.

3. The method according to claim 1, wherein the time-domain location of the synchronization signal block is associated with a start symbol of the timeslot in which the synchronization signal block is located, and the time-domain location of the control channel is associated with a start symbol of the timeslot in which the control channel is located.

4. The method according to claim 1, wherein one of the following situations exist:
   (a) the time-domain location of the control channel is orthogonal to a time-domain location of the broadcast channel and a synchronization signal associated with the broadcast channel;
   (b) the time-domain location of the control channel is the same or partially the same as the time-domain location of the broadcast channel and the synchronization signal associated with the broadcast channel; and
   (c) a portion of the time-domain location of the control channel is orthogonal to the time-domain location of the broadcast channel and the synchronization signal associated with the broadcast channel, and the other portion of the time-domain location of the control channel is the same or partially the same as the time-domain location of the broadcast channel and the synchronization signal associated with the broadcast channel.

5. The method according to claim 1, wherein determining the time-domain location of the control channel from the time-domain resource set based on the time-domain location of the synchronization signal block comprises:
   determining the time-domain location of the control channel based on a correspondence between the time-domain location of the synchronization signal block and the time-domain location of the control channel.

6. The method according to claim 1, wherein a subcarrier width of the broadcast channel is 30 kHz, a subcarrier width of the control channel is 30 kHz, and the time-domain resource set of the control channel indicated by the broadcast information includes a symbol with a number 0 and a symbol with a number 1 in the timeslot in which the control channel is located, wherein
   when the time-domain location of the synchronization signal block is symbols with numbers 2 to 5 in the timeslot in which the synchronization signal block is located, the time-domain location of the control channel is the symbol with the number 0 in the timeslot in which the control channel is located; or when the time-domain location of the synchronization signal block is symbols with numbers 6 to 9 in the timeslot in which the synchronization signal block is located, the time-domain location of the control channel is the symbol with the number 1 in the timeslot in which the control channel is located.

7. The method according to claim 1, wherein a subcarrier width of the broadcast channel is 30 kHz, a subcarrier width of the control channel is 30 kHz, and the time-domain resource set of the control channel indicated by the broadcast information includes symbols with numbers 0 to 1 and symbols with numbers 2 to 3 in the timeslot in which the control channel is located, wherein when the time-domain location of the synchronization signal block is symbols with numbers 4 to 7 in the timeslot in which the synchronization signal block is located, the time-domain location of the control channel is the symbols with the numbers 0 to 1 in the timeslot in which the control channel is located; or when the time-domain location of the synchronization signal block is symbols with numbers 8 to 11 in the timeslot in which the synchronization signal block is located, the time-domain location of the control channel is the symbols with the numbers 2 to 3 in the timeslot in which the control channel is located.

8. The method according to claim 1, wherein a subcarrier width of the broadcast channel is 15 kHz, and a subcarrier width of the control channel is 15 kHz, wherein when the time-domain location of the synchronization signal block is symbols with numbers 2 to 5 in the timeslot in which the synchronization signal block is located, the time-domain location of the control channel is symbols with numbers 0 to 1 in the timeslot in which the control channel is located.

9. The method according to claim 1, wherein a subcarrier width of the broadcast channel is 15 kHz, and a subcarrier width used by the control channel is 15 kHz, wherein when the time-domain location of the synchronization signal block is symbols with numbers 2 to 5 in the timeslot in which the synchronization signal block is located, the time-domain location of the control channel is a symbol with a number 0 in the timeslot in which the control channel is located.

10. The method according to claim 1, wherein a reference signal of the broadcast channel is quasi-co-located (QCL) with a reference signal of the control channel.

11. A control information receiving apparatus comprising:
a storage medium including executable instructions; and
a processor;
wherein the executable instructions, when executed by the processor, cause the apparatus to:
receive broadcast information carried in a broadcast channel, wherein the broadcast information comprises indication information used for indicating a time-domain resource set of control channels, and the broadcast information is located in a synchronization signal block;
determine a time-domain location of a control channel from the time-domain resource set based on a time-domain location of the synchronization signal block in a timeslot, wherein the time-domain location of the synchronization signal block is one of at least two predefined time-domain locations in at least one timeslot; and
perform control channel detection in the time-domain location of the control channel.

12. The apparatus according to claim 11, wherein there are at least two predefined time-domain locations in the timeslot in which the synchronization signal block is located.

13. The apparatus according to claim 11, wherein the time-domain location of the synchronization signal block is associated with a start symbol of the timeslot in which the synchronization signal block is located, and the time-domain location of the control channel is associated with a start symbol of the timeslot in which the control channel is located.

14. The apparatus according to claim 11, wherein one of the following situations exist:
(a) the time-domain location of the control channel is orthogonal to a time-domain location of the broadcast channel and a synchronization signal associated with the broadcast channel;
(b) the time-domain location of the control channel is the same or partially the same as the time-domain location of the broadcast channel and the synchronization signal associated with the broadcast channel; and
(c) a portion of the time-domain location of the control channel is orthogonal to the time-domain location of the broadcast channel and the synchronization signal associated with the broadcast channel, and the other portion of the time-domain location of the control channel is the same or partially the same as the time-domain location of the broadcast channel and the synchronization signal associated with the broadcast channel.

15. The apparatus according to claim 11, wherein the executable instructions, when executed by the processor, further cause the apparatus to:
determine the time-domain location of the control channel based on a correspondence between the time-domain location of the broadcast channel and the time-domain location of the control channel.

16. The apparatus according to claim 11, wherein a subcarrier width of the broadcast channel is 30 kHz, a subcarrier width of the control channel is 30 kHz, and the time-domain resource set of the control channel indicated by the broadcast information is a symbol with a number 0 and a symbol with a number 1 in the timeslot in which the control channel is located, wherein when the time-domain location of the synchronization signal block is symbols with numbers 2 to 5 in the timeslot in which the synchronization signal block is located, the time-domain location of the control channel is the symbol with the number 0 in the timeslot in which the control channel is located; or when the time-domain location of the synchronization signal block is symbols with numbers 6 to 9 in the timeslot in which the synchronization signal block is located, the time-domain location of the control channel is the symbol with the number 1 in the timeslot in which the control channel is located.

17. The apparatus according to claim 11, wherein a subcarrier width of the broadcast channel is 30 kHz, a subcarrier width of the control channel is 30 kHz, and the time-domain resource set of the control channel indicated by the broadcast information is symbols with numbers 0 to 1 and symbols with numbers 2 to 3 in the timeslot in which the control channel is located, wherein when the time-domain location of the synchronization signal block is symbols with numbers 4 to 7 in the timeslot in which the synchronization signal block is located, the time-domain location of the control channel is the symbols with the numbers 0 to 1 in the timeslot in which the control channel is located; or when the time-domain location of the synchronization signal block is symbols with numbers 8 to 11 in the timeslot in which the synchronization signal block is located, the time-domain location of the control channel is the symbols with the numbers 2 to 3 in the timeslot in which the control channel is located.

18. The apparatus according to claim 11, wherein a subcarrier width of the broadcast channel is 15 kHz, and a subcarrier width of the control channel is 15 kHz, wherein when the time-domain location of the synchronization signal block is symbols with numbers 2 to 5 in the timeslot in which the synchronization signal block is located, the time-domain location of the control channel is symbols with numbers 0 to 1 in the timeslot in which the control channel is located.

19. The apparatus according to claim 11, wherein a subcarrier width of the broadcast channel is 15 kHz, and a subcarrier width used by the control channel is 15 kHz, wherein when the time-domain location of the synchronization signal block is symbols with numbers 2 to 5 in the timeslot in which the synchronization signal block is located, the time-domain location of the control channel is a symbol with a number 0 in the timeslot in which the control channel is located.

20. The apparatus according to claim 11, wherein a reference signal of the broadcast channel is quasi-co-located (QCL) with a reference signal of the control channel.

21. A non-transitory computer-readable storage medium comprising executable instructions, wherein the executable instructions, when executed by a computer, cause the computer to:

receive broadcast information carried in a broadcast channel, wherein the broadcast information comprises indication information used for indicating a time-domain resource set of control channels, and the broadcast information is located in a synchronization signal block;

determine a time-domain location of a control channel in a timeslot from the time-domain resource set based on a time-domain location of the synchronization signal block in a timeslot, wherein the time-domain location of the synchronization signal block is one of at least two predefined time-domain locations in at least one timeslot; and perform control channel detection in the time-domain location of the control channel.

22. The non-transitory computer-readable storage medium according to claim 21, wherein there are at least two predefined time-domain locations in the timeslot in which the synchronization signal block is located.

23. The non-transitory computer-readable storage medium according to claim 21, wherein the time-domain location of the synchronization signal block is associated with a start symbol of the timeslot in which the synchronization signal block is located, and the time-domain location of the control channel is associated with a start symbol of the timeslot in which the control channel is located.

24. The non-transitory computer-readable storage medium according to claim 21, wherein one of the following situations exist:

(a) the time-domain location of the control channel is orthogonal to a time-domain location of the broadcast channel and a synchronization signal associated with the broadcast channel;

(b) the time-domain location of the control channel is the same or partially the same as the time-domain location of the broadcast channel and the synchronization signal associated with the broadcast channel; and (c) a portion of the time-domain location of the control channel is orthogonal to the time-domain location of the broadcast channel and the synchronization signal associated with the broadcast channel, and the other portion of the time-domain location of the control channel is the same or partially the same as the time-domain location of the broadcast channel and the synchronization signal associated with the broadcast channel.

25. The non-transitory computer-readable storage medium according to claim 21, wherein determining the time-domain location of the control channel from the time-domain resource set based on the time-domain location of the synchronization signal block comprises:

determining the time-domain location of the control channel based on a correspondence between the time-domain location of the synchronization signal block and the time-domain location of the control channel.

26. The non-transitory computer-readable storage medium according to claim 21, wherein a subcarrier width of the broadcast channel is 30 kHz, a subcarrier width of the control channel is 30 kHz, and the time-domain resource set of the control channel indicated by the broadcast information is a symbol with a number 0 and a symbol with a number 1 in the timeslot in which the control channel is located, wherein when the time-domain location of the synchronization signal block is symbols with numbers 2 to 5 in the timeslot in which the synchronization signal block is located, the time-domain location of the control channel is the symbol with the number 0 in the timeslot in which the control channel is located; or when the time-domain location of the synchronization signal block is symbols with numbers 6 to 9 in the timeslot in which the synchronization signal block is located, the time-domain location of the control channel is the symbol with the number 1 in the timeslot in which the control channel is located.

27. The non-transitory computer-readable storage medium according to claim 21, wherein a subcarrier width of the broadcast channel is 30 kHz, a subcarrier width of the control channel is 30 kHz, and the time-domain resource set of the control channel indicated by the broadcast information is symbols with numbers 0 to 1 and symbols with numbers 2 to 3 in the timeslot in which the control channel is located, wherein when the time-domain location of the synchronization signal block is symbols with numbers 4 to 7 in the timeslot in which the synchronization signal block is located, the time-domain location of the control channel is the symbols with the numbers 0 to 1 in the timeslot in which the control channel is located; or when the time-domain location of the synchronization signal block is symbols with numbers 8 to 11 in the timeslot in which the synchronization signal block is located, the time-domain location of the control channel is the symbols with the numbers 2 to 3 in the timeslot in which the control channel is located.

28. The non-transitory computer-readable storage medium according to claim 21, wherein a subcarrier width of the broadcast channel is 15 kHz, and a subcarrier width of the control channel is 15 kHz, wherein
    when the time-domain location of the synchronization signal block is symbols with numbers 2 to 5 in the timeslot in which the synchronization signal block is located, the time-domain location of the control channel is symbols with numbers 0 to 1 in the timeslot in which the control channel is located.

29. The non-transitory computer-readable storage medium according to claim 21, wherein a subcarrier width of the broadcast channel is 15 kHz, and a subcarrier width used by the control channel is 15 kHz, wherein
    when the time-domain location of the synchronization signal block is symbols with numbers 2 to 5 in the timeslot in which the synchronization signal block is located, the time-domain location of the control channel is a symbol with a number 0 in the timeslot in which the control channel is located.

30. The non-transitory computer-readable storage medium according to claim 21, wherein a reference signal of the broadcast channel is quasi-co-located (QCL) with a reference signal of the control channel.

* * * * *